US006599455B2

(12) United States Patent
Wierer et al.

(10) Patent No.: US 6,599,455 B2
(45) Date of Patent: Jul. 29, 2003

(54) PROCESS FOR PRODUCING WOOD PARTICLEBOARD

(75) Inventors: Konrad Alfons Wierer, Burghausen (DE); Abdulmajid Hashemzadeh, Burgkirchen (DE); Klaus Marquardt, Burghausen (DE)

(73) Assignee: Wacker Polymer Systems GmbH & Co. KG (DE)

( * ) Notice: Subject to any disclaimer, the term of this patent is extended or adjusted under 35 U.S.C. 154(b) by 0 days.

(21) Appl. No.: 10/004,098

(22) Filed: Oct. 31, 2001

(65) Prior Publication Data

US 2002/0074095 A1 Jun. 20, 2002

(30) Foreign Application Priority Data

Nov. 2, 2000 (DE) .......................................... 100 54 162

(51) Int. Cl.$^7$ ........................... B29B 9/00; B29B 11/12; B29B 13/10; B29C 70/00
(52) U.S. Cl. ........................ 264/118; 264/109; 264/123
(58) Field of Search .................... 264/109–128

(56) References Cited

U.S. PATENT DOCUMENTS

| 4,940,741 | A | | 7/1990 | De Wacker et al. | |
| 5,646,219 | A | * | 7/1997 | Teodorczyk ................ | 525/524 |
| 5,847,058 | A | * | 12/1998 | Teodorczyk ................ | 525/480 |

FOREIGN PATENT DOCUMENTS

| DE | 24 17 243 | | 11/1975 |
| DE | 43 16 498 A1 | | 11/1994 |
| DE | 195 11 130 A1 | | 10/1996 |
| DE | 196 06 393 A1 | | 8/1997 |
| DE | 197 29 161 A1 | | 1/1999 |
| DE | 199 41 904 A1 | | 3/2001 |
| EP | 0 497 100 | | 8/1992 |
| EP | 0 672 738 | | 9/1995 |
| WO | WO 97/31059 | | 8/1997 |
| WO | WO 97/45461 | | 12/1997 |
| WO | WO 99/02591 | | 1/1999 |
| WO | WO 99/09100 | | 2/1999 |

OTHER PUBLICATIONS

Fox T.G., Bull. Am. Physics Soc., 1, 3, p. 123 [1956].
The Polymer Handbook, 2$^{nd}$ Edition, J. Wiley & Sons, New York [1975].
Derwent Abstract Corresponding To DE 199 41 904 [AN 2001–354622].
Derwent Abstract Corresponding To WO 97/31059 [AN 1997–435120].
Derwent Abstract Corresponding To WO 97/45461 [AN 1998–019768].
Derwent Abstract Corresponding To WO 99/02591 [AN 1999–082379].
Derwent Abstract Corresponding To WO 99/09100 [AN 1999–154860].
Derwent Abstract Corresponding To DE 197 29 161 [AN 1999–082379].
Derwent Abstract Corresponding To DE 196 06 393 [AN 1997–435120].
Derwent Abstract Corresponding To DE 195 11 130 [AN 1996–435561].
Derwent Abstract Corresponding To DE 43 16 498 [AN 1995–000294].
Deppe, Ernst, Taschenbuch der Spanplattentechnik, 3$^{rd}$ Edition, 1991.
Chemical Abstracts 122 (1994) 109068.
WPIDS AN 1987–075307—Abstract Corresponding To JP–A 62027107.
Derwent Abstract corresponding to DE 24 17 243 [AN 1975–75920 W].
Derwent Abstract corresponding to EP 4 97 100 [AN 1992–260201].

* cited by examiner

*Primary Examiner*—Stephen J. Lechert, Jr.
(74) *Attorney, Agent, or Firm*—Brooks & Kushman P.C.

(57) ABSTRACT

Wood particleboard is produced by a process wherein wood particles, optionally comminuted, are treated with a crosslinkable thermoplastic binder comprising A), a copolymer of one or more comonomer units selected from vinyl esters of optionally branched $C_{1-18}$ alkylcarboxylic acids (meth)acrylic esters of optionally branched $C_{1-15}$ alcohols, dienes, olefins, vinylaromatics and vinyl halides, and from 0.1 to 50% by weight, of one or more units comprising carboxyl, hydroxy or NH groups, and B), a compound having at least two reactive groups which can react with carboxyl, hydroxy or NH groups, and selected from epoxy, N-methylol, isocyanate and ethylene carbonate groups.

17 Claims, No Drawings

PROCESS FOR PRODUCING WOOD PARTICLEBOARD

BACKGROUND OF THE INVENTION

1. Field of the Invention

The invention relates to a process for producing wood particleboard by bonding together with the wood particles by means of a crosslinkable binder.

2. Background Art

To produce wood particleboard, the wood particles, for example wood fibers or wood chips, are glued together by means of an organic adhesive under pressure and at elevated temperature. The most important binders for chipboard production are urea-formaldehyde resins (UF resins). To produce moisture-resistant wood chipboard, phenol-formaldehyde resins (PF resins) are of great importance. Melamine-formaldehyde resins (MF resins) or mixtures of all three resin types mentioned are also used for improving the moisture resistance of wood particleboard. A disadvantage of these adhesives is that formaldehyde is emitted both during production of the particleboard and during use of the finished, pressed particleboard. Organic isocyanates have become established as formaldehyde-free binders for wood particleboard, in which case diphenylmethane 4,4'-diisocyanate (MDI) is generally used. However, handling MDI also requires special safety precautions during production of the wood particleboard because of the very reactive isocyanate groups and the associated irritation of skin and bronchial passages. A further disadvantage of these reactive resins becomes apparent in the production of MD and HD fiberboard: here, the isocyanate groups react in the blow-line during the direct addition of binder because of the elevated temperature, which leads to a loss of up to 25% of the binding potential.

Thermoplastic adhesives, for example those based on polyvinyl acetate, are likewise used for producing wood particleboard, as disclosed in U.S. Pat. No. 4,940,741. A problem with polyvinyl acetate binders is dimensional stability over the relatively high temperature range used in particleboard production, for example during removal from the mold. For this reason thermoplastic adhesives are frequently used in combination with the abovementioned formaldehyde condensate resins, with the abovementioned disadvantages. A low-VOC adhesive for bonding wood particleboard is described in DE-A 19941904. This adhesive is an aqueous mixture of high-viscosity polyvinyl alcohol, carboxyl-functional polyvinyl acetate and a water-soluble metal salt of a monobasic acid.

Formaldehyde-free, thermally curable, aqueous binders for producing wood particleboard are known, for example, from WO-A 97/31059. In this publication, a mixture of carboxyl-functional copolymer and an alkanolamine having at least two hydroxy groups is used. Aqueous adhesive compositions comprising polycarboxylic acid and hydroxyalkyl-substituted aminoaliphatics are described in WO-A 97/45461. WO-A 99/02591 discloses compositions comprising a carboxyl-functional copolymer and long-chain amines. A disadvantage of these systems, which crosslink via an esterification reaction, is that crosslinking occurs only in the water-free state, on drying.

SUMMARY OF THE INVENTION

It is an object of the invention to provide a process for producing wood particleboard in which the emission of pollutants such as formaldehyde is avoided but high-quality bonding is nevertheless obtained, and premature reaction of functional groups is largely prevented. These and other objects are achieved by the binder systems of the subject invention, which comprise a copolymer containing carboxyl, hydroxy, or NH-functional monomers, and an epoxy, N-methylol, isocyanate, or ethylene carbonate-functional crosslinker reactive with the functional groups of the copolymer.

DETAILED DESCRIPTION OF THE PREFERRED EMBODIMENT(S)

The invention provides a process for producing wood particleboard, in which wood particles, if appropriate after a preceding comminution step, are treated with a crosslinkable binder and are subsequently pressed together under pressure and, if desired, elevated temperature to produce particleboard, wherein the binder comprises two constituents A) and B), where A) comprises a copolymer comprising one or more comonomer units selected from the group consisting of vinyl esters of unbranched or branched alkylcarboxylic acids having from 1 to 18 carbon atoms, acrylic esters or methacrylic esters of branched or unbranched alcohols having from 1 to 15 carbon atoms, dienes, olefins, vinylaromatics and vinyl halides, and from 0.1 to 50% by weight, based on the total weight of the copolymer, of one or more units comprising carboxyl, hydroxy or NH groups, and B) comprises at least one compound having at least two reactive groups which can react with the carboxyl, hydroxy or NH groups specified under A) and are selected from the group comprising epoxy, N-methylol, isocyanate and ethylene carbonate groups.

Suitable vinyl esters are vinyl esters of unbranched or branched carboxylic acids having from 1 to 18 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 5 to 11 carbon atoms, for example VeoVa9$^R$ or VeoVa10$^R$ vinyl esters available from Shell. Particular preference is given to vinyl acetate.

Suitable monomers from the group consisting of esters of acrylic acid or methacrylic acid are esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate and norbornyl acrylate. Particular preference is given to methyl acrylate, methyl methacrylate, n-butyl acrylate, 2-ethylhexyl acrylate and norbornyl acrylate.

Suitable dienes are 1,3-butadiene and isoprene. Examples of copolymerizable olefins are ethene and propene. Vinylaromatics which can be copolymerized include styrene and vinyltoluene. From the group of vinyl halides, use is usually made of vinyl chloride.

Suitable carboxyl-functional comonomers for copolymer A) are ethylenically unsaturated monocarboxylic and dicarboxylic acids, preferably acrylic acid, methacrylic acid, crotonic acid, itaconic acid, fumaric acid and maleic acid. The carboxyl function can also be introduced into the copolymer A) by copolymerization of maleic anhydride. Suitable hydroxy-functional comonomers are hydroxyalkyl acrylates and hydroxyalkyl methacrylates having a $C_1$–$C_8$-alkyl radical, preferably hydroxyethyl acrylate and methacrylate, hydroxypropyl acrylate and methacrylate, and hydroxybutyl acrylate and methacrylate. Suitable NH-functional comonomers are (meth)acrylamide, diacetoneacrylamide, maleimide, amides of monoalkyl maleates and fumarates, diamides of maleic and fumaric acids, amides of monovinyl glutarates and succinates, and amides of monoallyl glutarates and succinates. The NH-functional units can also be introduced into the copolymer A) as aminofunctional oligomers containing primary or secondary NH groups, preferably those containing primary NH groups such as Jeffamine® amines. The proportion of functional units in copolymer A) is preferably from 1 to 30% by weight, more preferably from 5 to 20% by weight, in each case based on the total weight of the copolymer.

Preference is given to the following base polymer compositions for the copolymer A) which in addition to the base monomers, further comprise the abovementioned functional groups: vinyl acetate polymers; vinyl ester-ethylene copolymers such as vinyl acetate-ethylene copolymers; vinyl ester-ethylene-vinyl chloride copolymers in which the vinyl esters present are preferably vinyl acetate and/or vinyl propionate and/or one or more copolymerizable vinyl esters such as vinyl laurate, vinyl pivalate, vinyl 2-ethylhexanoate, vinyl esters of alpha-branched carboxylic acids having from 5 to 11 carbon atoms, in particular vinyl esters of Versatic acid, i.e. VeoVa9$^R$ and/or VeoVa10$^R$; vinyl acetate copolymers with one or more copolymerizable vinyl esters such as vinyl laurate, vinyl pivalate, vinyl 2-ethylhexanoate, vinyl esters of alpha-branched carboxylic acids having from 5 to 11 carbon atoms, in particular vinyl esters of Versatic acid (VeoVa9$^R$, VeoVa10$^R$), which may further comprise ethylene; vinyl ester-acrylic ester copolymers, in particular with vinyl acetate and butyl acrylate and/or 2-ethylhexyl acrylate, which may further comprise ethylene; vinyl ester-acrylic ester copolymers with vinyl acetate and/or vinyl laurate and/or vinyl esters of Versatic acid and acrylic esters, in particular butyl acrylate or 2-ethylhexyl acrylate, which may further comprise ethylene.

Particular preference is given to (meth)acrylic ester polymers and styrene polymers: copolymers with n-butyl acrylate and/or 2-ethylhexyl acrylate; copolymers of methyl methacrylate with butyl acrylate and/or 2-ethylhexyl acrylate, and/or 1,3-butadiene; styrene-1,3-butadiene copolymers and styrene-(meth)acrylic ester copolymers such as styrene-butyl acrylate, styrene-methyl methacrylate-butyl acrylate or styrene-2-ethylhexyl acrylate, where n-, iso- and t-butyl acrylate can be used as butyl acrylate.

Most preferred are compositions containing a carboxyl-functional styrene-n-butyl acrylate copolymer and/or a carboxyl-functional styrene-methyl methacrylate-n-butyl acrylate copolymer as copolymer A).

Suitable crosslinkers B) include non-thermoplastic compounds such as epoxide crosslinkers of the bisphenol A type, i.e. condensation products of bisphenol A and epichlorohydrin or methylepichlorohydrin. Such epoxide cross-linkers are commercially available, for example under the trade names Epicote and Eurepox. Also suitable are blocked or unblocked diisocyanates which may also be commercial products, for example m-tetramethylxylene diisocyanate (TMXDI) and diphenylmethane diisocyanate (MDI).

Further suitable crosslinkers B) are copolymers which bear epoxy, N-methylol, ethylene carbonate or isocyanate group or combinations of these groups. The polymer compositions for the crosslinker B) may include the same comonomers described as suitable for copolymer A). Preference is given to the polymer compositions mentioned as preferred for the copolymer A) which contain comonomer units comprising epoxy, N-methylol, ethylene carbonate and/or isocyanate groups instead of the carboxyl, hydroxy or NH groups. Particular preference is given to (meth)acrylic ester polymers and styrene polymers, for example copolymers with N-butyl acrylate and/or 2-ethylhexyl acrylate; copolymers of methyl methacrylate with butyl acrylate and/or 2-ethylhexyl acrylate and/or 1,3-butadiene; styrene-1,3-butadiene copolymers and styrene-(meth)acrylic ester copolymers such as styrene-butyl acrylate, styrene-methyl methacrylate-butyl acrylate or styrene-2-ethylhexyl acrylate, where n-, iso-, t-butyl acrylate can be used as butyl acrylate.

The content of epoxy-, N-methylol-, ethylene carbonate- and isocyanate-functional comonomers is from 0.1 to 50% by weight, preferably from 1 to 30% by weight, particularly preferably from 5 to 20% by weight, in each case based on the total weight of the copolymer B). Suitable epoxide-functional comonomers are glycidyl acrylate, glycidyl methacrylate, allyl glycidyl ether, vinyl glycidyl ether, vinylcyclohexene oxide, limonene oxide, myrcene oxide, caryophyllene oxide, styrenes and vinyltoluenes substituted in the aromatic ring by a glycidyl group, and vinyl benzoates substituted in the aromatic ring by a glycidyl group. Suitable isocyanate-functional comonomers are 2-methyl-2-isocyanatopropyl methacrylate and isopropenyldimethyl-benzyl isocyanate (TMI). Suitable N-methylol-functional comonomers are N-methylolacrylamide (NMA), N-methylolmethacrylamide, allyl N-methylcarbamate, alkyl ethers such as the isobutoxy ether or esters of N-methylolacrylamide, of N-methylolmethacrylamide and of allyl N-methylcarbamate.

The most preferred crosslinkers B) are the epoxide crosslinkers of the bisphenol A type and epoxide-functional copolymers such as styrene-(meth)acrylic ester copolymers containing glycidyl methacrylate units.

The preparation of copolymer A) and, if desired, the polymeric crosslinker B) can be carried out by means of known free-radical-initiated polymerization processes, for example by means of solution polymerization or aqueous emulsion polymerization. For drying, it is possible to employ all customary drying methods: spray drying, drum drying, freeze drying, belt drying, or coagulation with subsequent fluidized-bed drying. Preference is given to using spray drying and drum drying methods. In the abovementioned copolymers, the comonomers are preferably copolymerized in such a ratio that both copolymer A) and copolymer B) have a melting point or a glass transition temperature "$T_g$" of >30° C., preferably ≧45° C. The glass transition temperature $T_g$ and the melting point of the polymers can be determined conventionally by means of differential scanning calorimetry (DSC). The $T_g$ can also be calculated approximately by means of the Fox equation. According to T. G. Fox, BULL. AM. PHYSICS Soc. 1, 3, page 123 (1956): $1/T_g=x_1/T_{g1}+x_2/T_{g2}+\ldots +x_n/T_{gn}$, where $x_n$ is the mass fraction (% by weight/100) of the monomer n and $T_{gn}$ is the glass transition temperature in degrees Kelvin of the homopolymer of the monomer n. $T_g$ values for homopolymers are given in the POLYMER HANDBOOK, 2nd Edition, J. Wiley & Sons, New York (1975).

The two constituents A) and B) are present in such a ratio that the molar ratio of functional comonomer units of constituent A) to those of constituent B) is in the range from 5:1 to 1:5. Particular preference is given to equimolar ratios of the functional comonomer units. If appropriately functionalized copolymers have been used for each of the constituents A) and B), they are selected so that they are compatible with one another, i.e. are miscible with one another on a molecular level. For this reason, the copolymers A) and B) present in the combination are usually chosen so that they are made up predominantly of the same comonomer units, apart from the functional comonomer units. The greatest preference is therefore given to compositions comprising carboxyl-functional styrene-n-butyl acrylate and/or styrene-methyl methacrylate-n-butyl acrylate copolymers as constituent A) and styrene-n-butyl acrylate and/or styrene-methyl methacrylate-n-butyl acrylate copolymer(s) containing glycidyl methacrylate units as constituent B).

The constituents A) and B) can be employed in dry, pulverulent form (dry gluing), or in the form of an aqueous dispersion or an aqueous solution (wet gluing). The constituents A) and B) can both be used as powder or both be used as aqueous solution or aqueous dispersion. It is also possible to use powders, aqueous solutions or aqueous dispersions in which both constituents A) and B) are present in admixture. Finally, it is also possible to use any combination of powders, solutions and dispersions in each of which one constituent is present. Depending on the process variant, the binder constituents A) and B) can be used separately or in admixture. When using pulverulent binders, the fibers may be wetted with water or an olefin wax emulsion. For this purpose, from 2 to 10% by weight of water and/or olefin wax emulsion, based on binder, may be sprayed onto the fibers or chips.

The production of wood particleboard is described in detail in Ernst Deppe, TASCHENBUCH DER SPANPLATTENTECHNIK, 3rd edition, 1991. To produce the wood particleboard, the wood particles are used as chips or fibers. The fibers or chips, which may optionally have been predried, are mixed with binder in customary mixing vessels such as ploughshare mixers. In general, the binder composition is used in an amount of from 5 to 30% by weight, preferably in an amount of from 7 to 15% by weight, in each case based on wood particle weight (solid/solid). The fibers or chips which have been mixed with binder are sprinkled uniformly on a molding belt and, if desired, subjected to preliminary cold pressing. The fiber layer is subsequently pressed by means of hot platens at temperatures of from 150° C. to 250° C. and under a pressure of from 10 to 100 bar to form boards.

To produce oriented strand board (OSB), strands having a length/width ratio of generally from 5:1 to 10:1 are used and are treated wet or dry with binder as described above and are then oriented and laid down in layers, after which they are hot pressed under the conditions mentioned.

In the production of medium density fiberboard (MDF) and high density fiberboard (HDF), the fibers are pretreated hydrothermally in a refiner unit, i.e. boiled and milled at elevated temperature under steam pressure, subsequently fluidized in a stream of steam in a blow-line, then dried in a drying tube, optionally precompacted in a cold press and finally pressed under pressure, preferably from 10 to 100 bar, and, if desired, elevated temperature, preferably from 150° C. to 250° C., to produce boards. To apply the binder, the fibers or chips, after milling while still under steam pressure and at temperatures of from 120° C. to 150° C., are sprayed with an aqueous dispersion or aqueous solution of the binder composition in the blow-line or in the drying tube or, when using pulverulent binder compositions, are mixed with the pulverent binder. The fibers which have been treated with binder are subsequently dried. As an alternative, the wood fibers can also be dried without having been treated with binder and are then mixed in the dry state with the binder in a suitable mixer.

Particular preference is given to a process in which the binder constituents A) and B) are used separately as two components (2-component system) for producing MDF and HDF. For this purpose, one component of the binder can be introduced into the mill of the refiner unit during the milling step. The greatest preference is given to a procedure in which a constituent of the binder, in particular constituent A), is introduced into the refiner unit before the mill, in the mill, or shortly after the mill in the blow-line, preferably in the first third thereof. The second constituent, namely the crosslinker component B), is introduced in a later stage of the process. This can be carried out at the end of the blow-line of the refiner unit, preferably in the last third thereof, during drying of the fibers in the drying tube or after drying of the fibers. The advantage of this process variant is that the crosslinker component B) is added in a process step in which thermal stress is lower, and thus much less premature crosslinking occurs.

EXAMPLES

Comparative Example C1

Spruce chips were boiled in a refiner at 5 bar and 147° C. for 5 minutes and milled at a milling disk spacing of 0.1 mm and a power input of 20 kW. The fibers were dried to a residual moisture content of 2% without application of binder and were stored in intermediate storage without compaction.

In a Lödige ploughshare mixer provided with a multistage knife head, 755 g of the milled fibers were uniformly mixed with 112 g (15% by weight) of pulverulent phenol-formaldehyde resin (PF). To improve adhesion of the powder, 5% by weight of water were introduced into the Lödige mixer. The binder-coated fibers were sprinkled uniformly by hand into a 50×50×40 cm (L×W×H) frame and compacted at room temperature. The resulting mat was taken from the frame and placed in a platen press and pressed to the intended thickness of 3 mm at a pressure of up to 50 bar for 180 sec at 200° C. The hot board was placed in an insulated box and kept warm for 12 hours to complete the crosslinking reaction, and subsequently cut up as appropriate and subjected to testing.

Example 2

The procedure of Comparative Example C1 was used, except that the binder was 15% by weight (solid/solid) of a powder mixture of a styrene-butyl acrylate-acrylic acid copolymer having a Tg of >50° C. and a styrene-butyl acrylate-glycidyl methacrylate copolymer having a Tg of >50° C., and the boards were not subjected to 12 hour storage prior to testing.

Example 3

The spruce chips were, in a manner analogous to that used in Comparative Example C1, boiled at 5 bar at 147° C. for 5 minutes in a refiner and milled at a milling disk spacing of 0.1 mm and a power input of 20 kW. Shortly after the mill, a mixture of aqueous dispersions of a styrene-butyl acrylate-acrylic acid copolymer having a Tg of >50° C. and a styrene-butyl acrylate-glycidyl methacrylate copolymer having a Tg of >50° C., each dispersion having a solids content of 50%, was added in an amount of 15% by weight (solid/solid) in the first third of the blow-line. The fibers which had been treated with binder were subsequently dried to a residual moisture content of 2% and stored in intermediate storage without compaction. The fibers which had been treated with binder were sprinkled uniformly by hand into a 50×50×40 cm frame and compacted at room temperature. This mat was taken from the frame and placed in a platen press and pressed to the intended thickness of 3 mm at a pressure of up to 50 bar for 180 sec at 200° C. The board was subsequently cut up as appropriate and subjected to testing.

Example 4

The spruce chips were, in a manner analogous to that used in Comparative Example C1, boiled at 5 bar at 147° C. for 5 minutes in a refiner and milled at a milling disk spacing of 0.1 mm and a power input of 20 kW. Shortly after the mill, an aqueous dispersion of a styrene-butyl acrylate-acrylic acid copolymer having a Tg of >50° C. in an amount of 9% by weight (solid/solid) was added in the first third of the blow-line. The fibers which had been treated with binder were subsequently dried to a residual moisture content of 2% and the dried fibers were mixed with 6% by weight of pulverulent styrene-butyl acrylate-glycidyl methacrylate copolymer having a Tg of >50° C. in a Lödige ploughshare mixer with multistage knife head. The fibers which had been treated with binder were sprinkled uniformly by hand into a 50×50×40 cm frame and compacted at room temperature. This mat was taken from the frame and placed in a platen press and pressed to the intended thickness of 3 mm at a pressure of up to 50 bar for 180 sec at 200° C. The board was subsequently cut up as appropriate and subjected to testing.

Example 5

1,500 g of industrial OSB spruce chips having a residual moisture content of 2% by weight were mixed in a drum with 2% by weight wax emulsion in 150 g of water together with 294 g (20% by weight) of a powder mixture of a styrene-butyl acrylate-acrylic acid copolymer having a Tg of >50° C. and a styrene-butyl acrylate-glycidyl methacrylate copolymer having a Tg of >50° C. The chips were placed in an oriented fashion on a 50×50 cm platen, and pressed to a thickness of 10 mm for 8 minutes at 200° C. The board was subsequently cut up as appropriate and subjected to testing.

Testing

The transverse tensile strength in accordance with EN 319, the flexural strength in accordance with DIN 52 362, and the thickness swelling after 2 hours and 24 hours in accordance with DIN 52 364, were measured on the particle boards produced. The results of the measurements are summarized in Table 1 below.

Comparative Example C1 displays high transverse tensile strength and flexural strength, and low water swelling. Since the phenol resin was not added in the refiner, but at room temperature to dry fibers, the full crosslinking capacity was available during pressing. A disadvantage is the long subsequent thermal treatment to allow the crosslinking reaction to proceed to completion. A further disadvantage is the high splintering tendency of the fiber boards due to the high degree of crosslinking and the low flexibility of the resin. This is particularly undesirable in applications in the automobile sector because of the danger of injury in the case of accidents. The board was yellow-brown in color and had a distinct unpleasant odor.

The board of Example 2 exhibited to similar strengths and swelling values compared to the board of Comparative Example C1. A particularly conspicuous feature is the ability to bend over 29 mm in the flexural test without fracture of the board occurring. Since the binder was added after drying of the fibers, the full crosslinking capacity is available.

The board of Example 3 was produced using the same resin as in Example 2, but by means of wet gluing in place of dry gluing. In the wet gluing procedure, the resin was generally distributed more uniformly over the fiber surface due to the greater turbulence and the long mixing section. Stronger binding of the fibers in the particleboard was therefore to be expected. However, comparison of the property values shows that the wet gluing is slightly weaker than the dry gluing. The cause of this loss of binding power is that partial crosslinking occurs in the refiner. On pressing, the resin displayed poorer flow and could no longer bind as well.

Example 4 (2-component process) gave the best strengths. Here, only one constituent, one having thermally stable functional groups, was introduced in the wet gluing step and an optimum binder distribution was achieved. The second constituent having crosslinkable, thermally unstable groups was added in a dry gluing step with brief and low thermal stressing. Thus, the full crosslinking capacity was available in the pressing step.

Example 5 led to a board having good strength and low water swelling for an OSB.

In contrast to the boards bound with phenol-formaldehyde resin (Comparative Example C1), Examples 2 to 5 display no discoloration caused by the resin. Examples 2 to 5 produce no emissions of formaldehyde since the crosslinking systems used were free of formaldehyde and its derivatives.

TABLE 1

| Example | Transverse tensile strength N/mm$^2$ | Flexural strength N/mm$^2$ | E modulus in flexure | Swelling 2 h | Swelling 24 h |
|---|---|---|---|---|---|
| C. Ex. C1 | 1.37 | 60.3 | 6226 | 4 | 12 |
| Ex. 2 | 1.01 | 48.0 | 5021 | 6 | 16 |
| Ex. 3 | 0.95 | 43.6 | 4772 | 13 | 29 |
| Ex. 4 | 1.93 | 56.4 | 5177 | 8 | 21 |
| Ex. 5 | 0.15 | 15.3 | — | 9 | 35 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated otherwise.

What is claimed is:

1. In a process for producing wood particleboard, in which wood particles, optionally after a preceding comminution step, are treated with a crosslinkable binder and are subsequently pressed together under pressure and, if desired, elevated temperature to produce boards, the improvement comprising selecting as the binder a binder comprising two constituents A) and B), where A) comprises a copolymer derived from one or more base comonomer unit(s) selected from the group consisting of vinyl esters of unbranched or branched alkylcarboxylic acids having from 1 to 18 carbon atoms, acrylic esters of branched or unbranched alcohols having from 1 to 15 carbon atoms, methacrylic esters of branched or unbranched alcohols having from 1 to 15 carbon atoms, dienes, olefins, vinylaromatics and vinyl halides, and from 0.1 to 50% by weight, based on the total weight of the copolymer, of one or more comonomer units comprising carboxyl, hydroxy, or NH functional groups, and B) is at least one compound having at least two reactive groups which can react with the functional groups of A) and which are selected from the group consisting of epoxy, N-methylol, isocyanate, ethylene carbonate groups, and mixtures thereof.

2. The process of claim 1, wherein constituent A) comprises carboxyl-functional comonomer units obtained by copolymerization of said base comonomer unit(s) with ethylenically unsaturated monocarboxylic or dicarboxylic acids and/or by copolymerization of said base comonomer unit(s) with maleic anhydride.

3. The process of claim 1, wherein carboxyl-functional styrene-n-butyl acrylate and/or carboxyl-functional styrene-methyl methacrylate-n-butyl acrylate copolymers are present as constituent A).

4. The process of claim 2, wherein carboxyl-functional styrene-n-butyl acrylate and/or carboxyl-functional styrene-methyl methacrylate-n-butyl acrylate copolymers are present as constituent A).

5. The process of claim 1, wherein constituent B) comprises an epoxide crosslinker of the bisphenol A type or a diisocyanate crosslinker.

6. The process of claim 1, wherein constituent B) comprises copolymer(s) of one or more comonomer units selected from the group consisting of vinyl esters of unbranched or branched alkylcarboxylic acids having from 1 to 18 carbon atoms, acrylic esters of branched or unbranched alcohols having from 1 to 15 carbon atoms, methacrylic esters of branched or unbranched alcohols having from 1 to 15 carbon atoms, dienes, olefins, vinylaromatics and vinyl halides, and comonomer units comprising at least one of epoxy, N-methylol, ethylene carbonate and isocyanate groups.

7. The process of claim 6, wherein constituent B) comprises (meth)acrylic ester polymers; styrene polymers; copolymers of methyl methacrylate with butyl acrylate and/or 2-ethylhexyl acrylate and/or 1,3-butadiene; styrene-1,3-butadiene copolymers and styrene-(meth)acrylic ester copolymers; each polymer or copolymer of constituent B) further containing comonomer units comprising epoxy, N-methylol, ethylene carbonate or isocyanate groups.

8. The process of claim 6, wherein constituent A) comprises a carboxyl-functional styrene-n-butyl acrylate copolymer and/or carboxyl-functional styrene-methyl methacrylate-n-butyl acrylate copolymer, and constituent B) comprises a styrene-n-butyl acrylate copolymer containing glycidyl methacrylate monomer-derived units and/or a styrene-methyl methacrylate-n-butyl acrylate copolymer containing glycidyl methacrylate monomer-derived units.

9. The process of claim 1, wherein the amounts of A) and B) are such that the molar ratio of functional groups of constituent A) to those of constituent B) is in the range from 5:1 to 1:5.

10. The process of claim 1, wherein the constituents A) and B) are both used as powder or both used as aqueous solution or aqueous dispersion, or are used as powders, aqueous solutions or aqueous dispersions which each comprise both constituents A) and B) in admixture, or are used as any combination of powders, solutions and dispersions which each comprise one constituent.

11. The process of claim 1, comprising mixing wood particles with a binder comprising A) and B) in an amount of from 5 to 30% by weight of A) and B), based on wood particles (solid/solid), sprinkling onto a molding belt, and subsequently pressing at temperatures of from 150° C. to 250° C. under a pressure of from 10 to 100 bar to produce boards.

12. The process of claim 11, wherein the wood particles are strands having a length/width ratio of from 5:1 to 10:1 which are then oriented, laid down in layers, and pressed.

13. The process of claim 1, wherein the wood particles are fibers, and the fibers are pretreated hydrothermally in a refiner unit, treated with binder while still under steam pressure and at temperatures of from 120° C. to 150° C. by spraying with an aqueous dispersion or aqueous solution of the binder composition in a blow-line or in a drying tube of the refiner unit or, when using pulverulent binder compositions, are mixed with the fibers, and following drying, the fiber layer is pressed at temperatures of from 150° C. to 250° C. under a pressure of from 10 to 100 bar to produce boards.

14. The process of claim 13, wherein the wood fibers are dried without treatment with binder and are mixed in the dry state with binder in a suitable mixer.

15. The process of claim 13, wherein one constituent of the binder is added in the refiner unit and the second constituent is added in a later stage of the process.

16. The process of claim 13, wherein constituent A) is added in the refiner unit before the mill, in the mill, or shortly after the mill, in the first third of the blow-line, and the crosslinker constituent B) is added in the last third of the blow-line of the refiner unit, during drying of the fibers in the drying tube, or after drying of the fibers.

17. The process of claim 1, wherein said wood particles are treated with said binder and pressed to form an intermediate product containing uncured binder, which is subsequently cured under pressure at a temperature sufficient to crosslink said binder.

* * * * *